United States Patent
Nakagawa et al.

[11] Patent Number: 5,934,089
[45] Date of Patent: Aug. 10, 1999

[54] AIR CONDITIONING CONTROLLER FOR A HYBRID CAR

[75] Inventors: Tadashi Nakagawa; Takayoshi Matsuno, both of Aichi-ken, Japan

[73] Assignee: Toyota Jidosha Kabushiki Kaisha, Toyota, Japan

[21] Appl. No.: 09/033,998

[22] Filed: Mar. 3, 1998

[30] Foreign Application Priority Data

Mar. 5, 1997 [JP] Japan .................................. 9-050301

[51] Int. Cl.⁶ ................................................ B60H 1/00
[52] U.S. Cl. .............................. 62/133; 62/229; 62/323.1
[58] Field of Search ................... 62/133, 134, 323.1, 62/323.3, 323.4, 236, 226, 227, 229, 244, 243; 165/42, 43

[56] References Cited

U.S. PATENT DOCUMENTS

| | | | |
|---|---|---|---|
| 2,962,873 | 12/1960 | Anderson | 62/236 X |
| 4,825,663 | 5/1989 | Nijjar et al. | 62/243 X |
| 5,331,821 | 7/1994 | Hanson et al. | 62/133 |
| 5,333,678 | 8/1994 | Mellum et al. | 62/236 X |
| 5,487,278 | 1/1996 | Hilleveld et al. | 62/323.3 X |

FOREIGN PATENT DOCUMENTS 5-328521  12/1993  Japan .
6-286459  10/1994  Japan .

*Primary Examiner*—Harry B. Tanner
*Attorney, Agent, or Firm*—Burns, Doane, Swecker & Mathis, LLP

[57] ABSTRACT

When the vehicle stops, a target blowout temperature, a temperature after evaporator, and a predetermined temperature which has been preset are compared with each other. Accordingly, when it is judged that cooling capacity is maintained, a "start engine" demand is not outputted. When it is judged that cooling capacity is not obtained, a "start engine" demand is outputted. After a "start engine" demand has been outputted, even when cooling capacity is maintained, an engine is not stopped. As a result, fuel wastage and annoyance causing to passengers by the engine that keeps on starting up when the vehicle stops can be prevented.

22 Claims, 3 Drawing Sheets

AIR CONDITIONING CONTROLLER FOR A HYBRID CAR

BACKGROUND OF THE INVENTION

1. Field of the Invention

The present invention relates to an air conditioning controller which controls an air conditioner for a vehicle. More particularly, the present invention relates to an air conditioning controller for a hybrid car which has an electric motor in addition to an engine serving as a power source for motion of the vehicle.

2. Description of the Related Art

Usually, in air conditioners of vehicles, when an evaporator is sufficiently cooled and when the cooling load is low, use of a compressor is refrained in order to save energy.

In recent years, a hybrid car having an electric motor which generates driving force through electricity in combination with an engine which generates driving force through the combustion of fuel such as gasoline and the like has been proposed. Even when an engine is stopped, this hybrid car can travel by driving an electric motor with electric power supplied from batteries. Further, batteries may be charged beforehand, or batteries may be charged by electric power generated through the driving force from the engine while traveling.

Even in the aforementioned air conditioner in a hybrid car, a compressor must be driven whenever a vehicle interior portion is air-conditioned. For this reason, Japanese Patent Application Laid-Open (JP-A) No. 6-286459 discloses that when an engine has been stopped, it can be started again by operating the driving switch of an air conditioner so that a compressor is driven by the driving force of the engine.

Therefore, a motor for driving the compressor of an air conditioner is unnecessary. Further, it becomes possible to operate the air conditioner without making use of driving force generated from the electric motor or electric power generated from batteries for operating the electric motor.

In the hybrid car, when the vehicle stops, the engine stops. Accordingly, an engine can be prevented from being run unnecessarily in order to improve fuel economy.

However, while the engine stops, if the operating switch of an air conditioner is switched ON when the engine is off, the engine starts up. Moreover, if the vehicle stops traveling with the air conditioner in use, the engine keeps on running. As a result, wasteful consumption of fuel occurs.

In order to prevent such fuel wastage, a way of starting an engine in concert with the driving of a compressor has been thought of. However, an engine that keeps on starting up when a vehicle stops could annoy passengers.

SUMMARY OF THE INVENTION

In view of the aforementioned, it is an object of the present invention to provide an air conditioning controller for a hybrid car in which the amount of fuel consumed through the operation of an air conditioner can be reduced, and fuel economy can be improved.

The first aspect of the present invention is an air conditioning controller for a hybrid car, which is provided in the hybrid car being equipped with an engine and an electric motor and having starting means for starting the engine in response to a "start engine" demand, and which controls an air conditioner for air-conditioning a vehicle interior portion via a cooling cycle formed by a compressor and an evaporator, comprises temperature after evaporator detecting sensor which detects the temperature of air cooled by the evaporator, judging means which judges whether the temperature after evaporator detected by the temperature after evaporator detecting sensor is equal to or lower than a predetermined temperature, and stopping means which stops said "start engine" demand when the temperature after evaporator detected by the temperature after evaporator detecting sensor is judged to be equal to or lower than a predetermined temperature.

In accordance with the first aspect of the present invention, when the vehicle stops, if the temperature after the evaporator is equal to or lower than a predetermined temperature, the engine does not start. The predetermined temperature may be a temperature at which it can be judged that minimum cooling capacity can be maintained without driving a compressor. Accordingly, the amount of fuel consumed for driving an engine can be reduced without deteriorating cooling capacity of an air conditioner. A predetermined temperature may be the temperature needed for minimum cooling capacity or may be the higher of the temperature needed for minimum cooling capacity (a first temperature) and the temperature of blowout air at the time when the aforementioned air-conditioned air is blown into a vehicle interior portion to regulate the temperature of the vehicle interior portion to a set temperature (a second temperature).

Further, as described above, a "start engine" demand may be canceled even when the vehicle is either in a traveling state or in a stopping state. When the vehicle travels, the temperature needed for minimum cooling capacity is used as a predetermined value. When the vehicle stops, the higher of the temperature needed for minimum cooling capacity and the temperature of blowout air at the time when the aforementioned air-conditioned air is blown into a vehicle interior portion to set the temperature of the vehicle interior portion to a set temperature (the second temperature) may be used as a predetermined temperature.

In accordance with the first aspect of the present invention, when it has been judged by the judging means that the temperature after the evaporator exceeds a predetermined temperature, stopping of the "start engine" demand by the stopping means is canceled and a "start engine" demand is outputted to the starting means.

In this way, when the temperature after the evaporator exceeds a predetermined temperature, the engine is started. Accordingly, when the vehicle stops, sufficient cooling capacity can be maintained.

The first aspect of the present invention is an air conditioning controller for a hybrid car further comprising detecting means for detecting whether a vehicle is stopped, wherein in a case in which when it is detected by the detecting means that the vehicle has been stopped, the operation of the stopping means may be prohibited.

In this way, when an engine is started in order to obtain a cooling capacity while the vehicle is stopping, the engine is kept on starting up.

Accordingly, annoyance caused to passengers by the engine that keeps on starting up when the vehicle stops can be prevented.

The second aspect of the present invention is an air conditioning controller for a hybrid car, which is provided in the hybrid car being equipped with an engine and an electric motor and having starting means for starting the engine in response to a "start engine" demand, and which controls an air conditioner for air-conditioning a vehicle interior portion via a cooling cycle formed by a compressor and an evaporator, comprising, a temperature after evaporator detecting sensor which detects the temperature of air cooled by the evaporator, a vehicle interior portion temperature detecting sensor which detects the temperature of the vehicle interior portion, first judging mean which judges whether the difference between the temperature of the vehicle interior portion detected by the vehicle interior portion temperature detecting sensor and a set temperature is greater than a predetermined value, second judging means which judges whether the temperature after the evaporator detected by the temperature after evaporator detecting sensor is greater than a predetermined temperature in a case in which the result of the judgment by the first judging means is negative, and stopping means which stops the "start engine" demand in a case in which the result of the judgment by the second judging means is negative.

In accordance with the second aspect of the present invention, in a case in which the difference between the temperature of the vehicle interior portion and the set temperature is equal to or lower than a predetermined value and the temperature after the evaporator is equal to or less than a predetermined temperature, namely, in a case in which the difference between the aforementioned temperatures is equal to or less than an optimum temperature that makes human beings feel comfortable, a "start engine" demand is stopped and the engine is not started. Accordingly, the engine can be started at minimum of necessity. As a result, the amount of fuel consumed for driving the engine can be reduced.

As described above, a "start engine" demand can be stopped in both cases in which the vehicle travels and stops. It can be detected by the detecting means whether the vehicle has stopped. The detecting means is the engine control computer which drives the engine or the vehicle speed means which detects vehicle speed.

In accordance with the second aspect of the present invention, in a case in which the difference between the temperature of the vehicle interior portion and the set temperature is more than a predetermined value or in which the temperature after the evaporator is more than a predetermined temperature, stopping of the "start engine" demand by the stopping means is canceled and a "start engine" demand is outputted to the starting means.

Accordingly, in a case in which the difference between the temperature of the vehicle interior portion and the set temperature is more than a predetermined value or in a case in which the temperature after evaporator is more than a predetermined temperature, the engine is started. As a result, even when the vehicle stops, sufficient cooling capacity can be maintained.

BRIEF DESCRIPTION OF THE DRAWINGS

FIG. 2 is a flowchart showing a drive demand control routine which starts when the air conditioner according to the first embodiment is switched ON.

FIG. 3 is a flowchart showing a drive demand control routine which starts when an air conditioner according to a second embodiment is switched ON.

DESCRIPTION OF THE PREFERRED EMBODIMENTS

Figure 1:
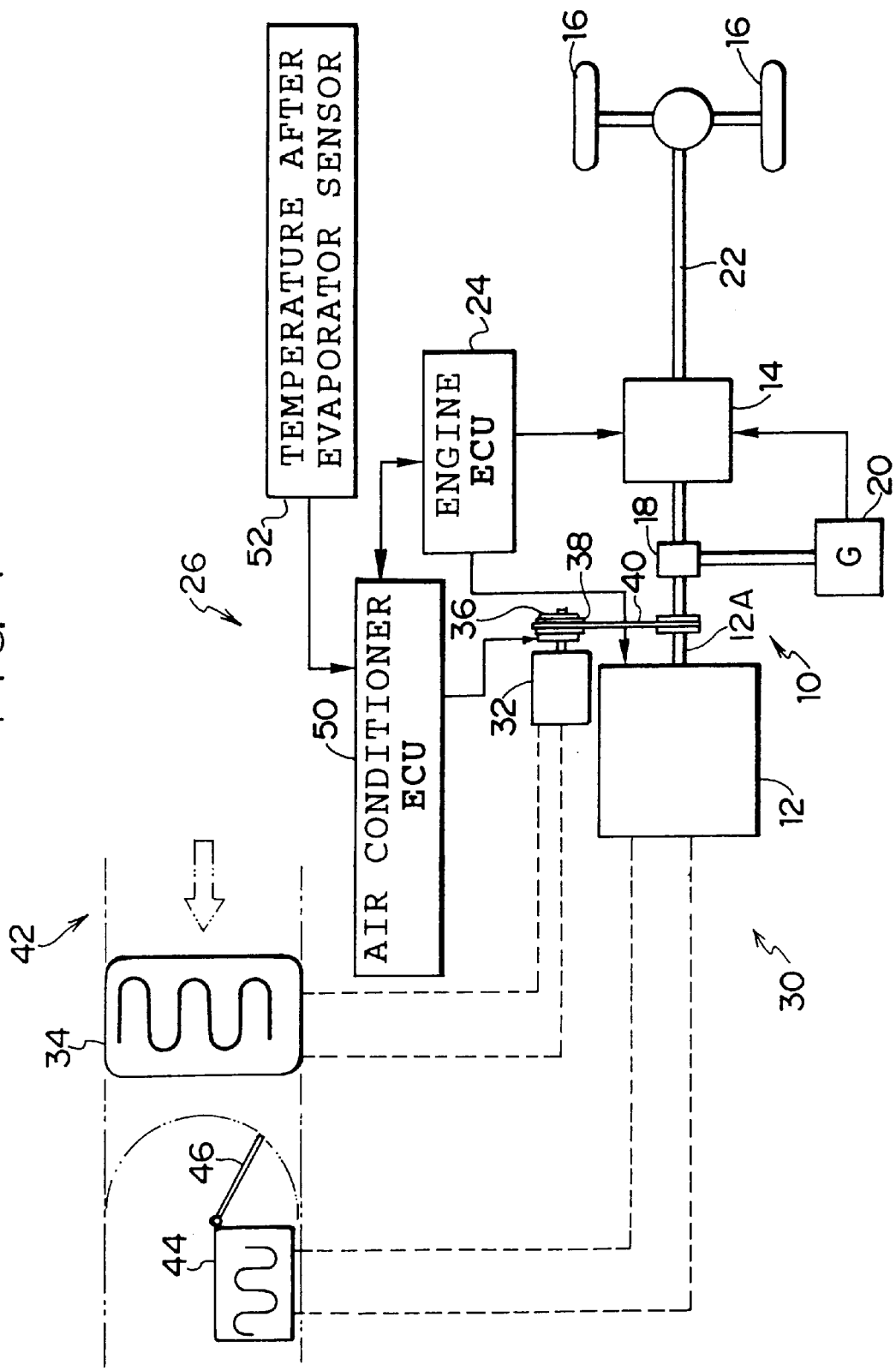
FIG. 1 is a schematic structural view of a hybrid car and an air conditioner which are applied to a first embodiment of the present invention.

A description of a first embodiment of the present embodiment will be given hereinafter. FIG. 1 shows a schematic structural view of a hybrid car 10 which is applied to the present first embodiment.

The hybrid car (vehicle) 10 has an engine 12 and an assist motor 14 as driving source for the vehicle to travel. The driving forces of the engine 12 and the assist motor 14 are outputted to a driving wheel 16 via a transmission (not shown). Accordingly, the hybrid car (vehicle) 10 travels. A driving shaft 12A of the engine 12 is connected to the assist motor 14 and a generator 20 via a planetary gear 18.

The generator 20 receives the driving force transmitted from the engine 12 and thereby generates electric power. The electric power is directly supplied to the assist motor 14, and via batteries which are not shown. Further, the assist motor 14 is rotated and driven in accordance with the driving of the engine 12 by electric power which is supplied from the generator 20 and by electric power which is supplied via batteries which are not shown. The drive forces from the engine 12 and the assist motor 14 are output to an output shaft 22.

The engine 12 and the assist motor 14 are connected to an engine ECU 24 and are controlled by the engine ECU 24 so as to be driven. For example, the engine ECU 24 sets a target torque and a target rotational frequency on the basis of the power to be output to the output shaft 22, and controls the engine 12 and the assist motor 14 so as to maintain the set target torque and the set target rotational frequency.

The hybrid car 10 has an air conditioner (which is referred to an air conditioner 30) which is equipped with an air conditioning controller 26 to which the present invention is applied. The air conditioner 30 has a cooling cycle including a compressor 32, an evaporator 34, or the like. The compressor 32 is connected to a pulley 38 having an electro-magnetic clutch 36 provided at a rotation shaft of the pulley 38. The driving force is transmitted to the compressor 32 from the engine 12 via an endless driving belt 40 which is entrained around the pulley 38.

In the air conditioner 30, by the compressor 32 being rotated and driven, refrigerant circulates in a cooling cycle and the evaporator 34 is cooled.

The evaporator 34 is provided within an air conditioning duct 42. A heater core 44 and an air mix damper 46 into which the cooled water is supplied from the engine 12 are provided within the air conditioning duct 42.

The air conditioner 30 suctions vehicle external air and vehicle interior air into the air conditioning duct 42 by a blower fan (not shown). The suctioned air is cooled by the evaporator 34. The cooled air is partially supplied into a heater core 44 by the air mix damper 46. The air which has bypassed the heater core 44 and the air which has passed through the heater core 44 and has been heated are mixed. Thereafter, the mixed air is blown into the vehicle interior portion as air conditioning wind.

An air conditioner ECU 50 is provided at the air conditioning controller 26 of the air conditioner 30. A temperature after evaporator sensor 52 which detects the temperature of the air which has passed through the evaporator 34 (the "temperature after evaporator"), and various sensors which are not shown and detect environmental conditions such as outside air, vehicle interior temperature, amount of solar radiation, and the like, are connected to the air conditioner ECU 50. The air conditioner ECU 50 controls the air conditioner 30 and air-conditions the vehicle interior portion, on the basis of detected results by these sensors and operating conditions such as setting temperature or the like which is set by passengers operating an operating panel (not shown) provided as setting means.

At this time, the air conditioner ECU 50 sets the temperature after evaporator on the basis of environmental conditions and operating conditions, and controls the compressor 32 such that the air, which has passed through the evaporator 34, is at the temperature after evaporator. When blowout temperature (a target blowout temperature) is set to regulate the temperature of the vehicle interior portion to a setting temperature, the air conditioner ECU 50 controls the air mix damper 46 so as to obtain the blowout temperature.

A conventionally known mechanism and control method which are used for a hybrid car as well as various vehicles can be applied to a mechanism and a control method for optimally air-conditioning the vehicle interior portion, and a detailed description thereof will be omitted.

The air conditioner ECU 50 is connected to the engine ECU 24. The air conditioner ECU 50 switches ON the electromagnetic clutch 36 in accordance with the driving of the compressor 32 and outputs a "start engine" signal to the engine ECU 24.

When the engine ECU 24 receives a "start engine" demand outputted from an apparatus such as the air conditioner ECU 50 or the like while the engine 12 is stopping, the engine ECU 24 starts the engine 12. While the engine ECU 24 is driving the engine 12 by receiving a "start engine" demand from an external apparatus, in a case in which a "start engine" demand is canceled or stopping of the "start engine" demand is outputted, the engine ECU 24 stops the engine 12.

The air conditioner ECU 50 reads a traveling rate of the vehicle 10, which is output from the engine ECU 24 and judges whether the vehicle 10 is traveling or stopping. Namely, the engine ECU 24 serves as detecting means and is connected to the air conditioner ECU 50. A vehicle speed sensor or the like may be used as detecting means.

Figure 2:
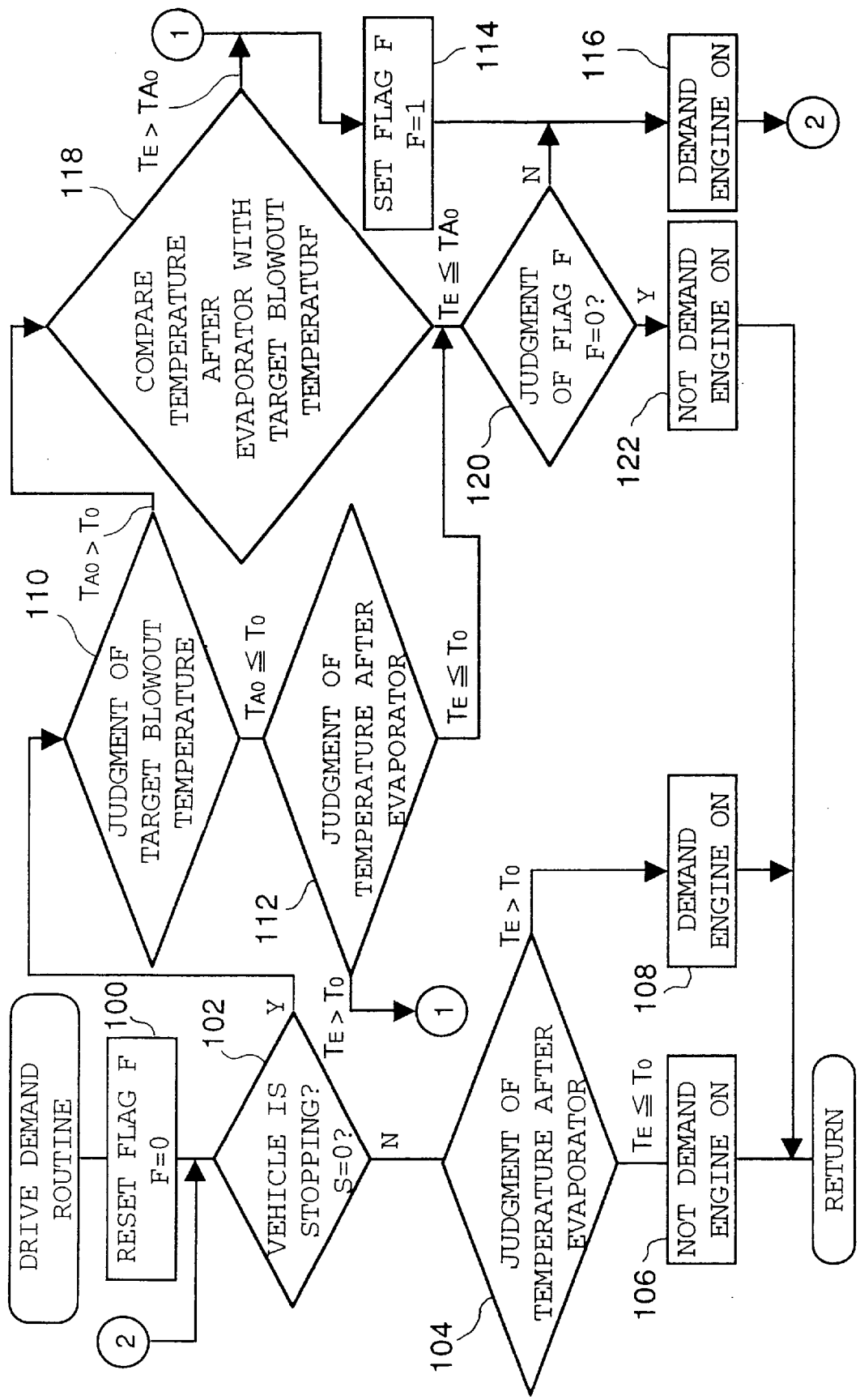

As an operation of the present embodiment, an example of a "start engine" demand for the engine 12 outputted from the air conditioner ECU 50 will be explained hereinafter with reference to a flowchart which is shown in FIG. 2.

As described above, when the air conditioner 30 is instructed to operate by setting means (not shown), the air conditioning of the vehicle interior portion is effected on the basis of environmental conditions and setting conditions. At this time, when the compressor 32 must be driven, the air conditioner ECU 50 outputs a "start engine" demand to the engine ECU 24. When the vehicle 10 stops, the engine ECU 24 stops the engine 12 so as to save power energy. When the engine ECU 24 receives a "start engine" demand from the air conditioner ECU 50 or the like, the engine ECU 24 starts the engine 12. When a "start engine" demand is terminated entirely, the engine ECU 24 stops the engine 12.

With reference to a flowchart in FIG. 2, a description of a "start engine" demand outputted from the air conditioner ECU 50 to the engine ECU 24 will be given hereinafter.

This flowchart executes the routine when the air conditioner 30 is switched ON by an operation switch provided at setting means (not shown), while it terminates the routine when the air conditioner 30 is switched OFF by the operational switch.

First, in Step 100, after flag F has been reset (F=0), the routine is executed. Next, in Step 102, it is judged whether the vehicle 10 is traveling. Namely, it is judged whether a speed S outputted from the engine ECU 24 equals to S=0.

When the vehicle 10 is traveling, because the speed equals to S≠0, the judgment is negative in Step 102, and the routine goes to Step 104. In Step 104, the temperature after evaporator $T_E$ is compared with a predetermined temperature (a first temperature) $T_0$. The temperature needed for minimum cooling capacity by the evaporator 34 is preset as $T_0$. It is desirable that cooling performance at the minimum of necessity can be obtained by the aforementioned temperature $T_0$. It is also desirable that the temperature $T_0$ suffices that the differences between humidities of blowout air are not increased. The temperature $T_0$ may be a variable value which decreases as cooling load increases.

When the temperature after evaporator $T_E$ is equal to or lower than the temperature $T_0$ ($T_E \leq T_0$), it is judged that the cooling capacity is reliably maintained. The routine goes to Step 106 where a "start engine" demand is not outputted, and exits the flowchart.

When the temperature after evaporator $T_E$ is higher than the temperature $T_0$ ($T_E \geq T_0$), it is judged that sufficient cooling capacity is not maintained. The routine goes to Step 108 where a "start engine" demand is effected for the engine ECU 24. Namely, a signal representing a "start engine" demand is output to the engine ECU 24. At the same time, the air conditioner 50 switches ON the electromagnetic clutch 36 so as to drive the compressor 32 due to the driving force from the engine 12.

When the engine ECU 24 receives a "start engine" demand outputted from the air conditioner ECU 50, in a case in which the engine 12 stops, the engine ECU 24 drives the engine 12. Accordingly, the driving force is transmitted from the engine 12 to the compressor 32 so that the temperature after evaporator $T_E$ is decreased.

When the vehicle is stopping, the judgment is affirmative in Step 102, the routine goes to Step 110. In Step 110, the aforementioned temperature $T_0$ and a target blowout temperature (a second temperature) $T_{A0}$ are compared with each other.

When the target blowout temperature $T_{A0}$ is equal to or lower than the temperature $T_0$, the routine goes to Step 112 where the temperature after evaporator $T_E$ is compared with the temperature $T_0$. When the temperature after evaporator $T_E$ is higher than the temperature $T_0$ ($T_E > T_0$), the routine goes to Step 114 where flag F is set (F=1). Thereafter, a "start engine" demand is outputted to the engine ECU 24 (Step 116). When the vehicle 10 stops and the engine 12 stops, the engine ECU 24 starts the engine 12 in response to a "start engine" demand. Accordingly, the compressor 32 is driven and the temperature after evaporator $T_E$ is lowered.

When the temperature after evaporator $T_E$ is equal to or less than the temperature $T_0$, it is judged that a cooling capacity by the evaporator 34 can be reliably maintained. The routine goes to Step 120.

When a target temperature $T_{A0}$ is higher than the temperature $T_0$, the routine goes from Step 110 to Step 118, where the temperature after evaporator $T_E$ and a target blowout temperature $T_{A0}$ are compared with each other.

When the temperature after evaporator $T_E$ is higher than the target blowout temperature $T_{A0}$, it is judged that a cooling capacity is not sufficient. In Step 114, flag F is set. Thereafter, a "start engine" demand is outputted by the engine ECU 24 (Step 116).

In this way, only when the temperature after evaporator $T_E$ is higher than the temperature set for obtaining minimum cooling capacity without driving the compressor 32, a "start engine" demand is outputted. For this reason, unnecessary starting up of the engine 12 while the vehicle 10 is stopping and wasteful fuel consumption can be prevented.

When the temperature after evaporator $T_E$ is equal to or lower than the temperature which is set for obtaining minimum cooling capacity without driving the compressor 32 (Step 112: $T_E \leq T_0$, Step 118: $T_E \leq T_{A0}$), it is judged that minimum cooling capacity is maintained and the routine goes to Step 120.

In Step 120, it is judged whether flag F is in a reset state. Flag F is reset when the vehicle 10 starts to travel. In other words, when the engine 12 is started for the vehicle 10 to travel, flag F is reset. However, in a state in which the vehicle 10 stops, flag F is set when a "start engine" demand for the engine 12 is outputted to the engine ECU 24.

In Step 120, it is judged whether a "start engine" demand is outputted after the vehicle 10 has stopped. When flag F is in a reset state, the judgment is affirmative in Step 120, and the routine goes to Step 122, where a "start engine" demand is not outputted, and the routine exits the flowchart. In this state, the engine 12 is stopped by a demand (stopping of the "start engine" demand) from the air conditioner ECU 50.

A state in which flag F is set is a state in which a "start engine" demand has already been outputted and the engine 12 has already started. At this time, the judgment is negative in Step 120, and the routine goes to Step 116 where a "start engine" demand is outputted. At least, the state in which the engine 12 is started by stopping of "start engine" demand by the air conditioner ECU 50 should be maintained.

Thus, after the vehicle 10 has stopped, once the engine 12 is started, it is desirable not to start the engine 12 uselessly. When the vehicle stops and the engine 12 also stops, it is estimated that noise may be caused at a low level. In this state, the engine 12 which keeps on starting up when the vehicle 10 stops could annoy passengers. However, in accordance with the present embodiment, the aforementioned annoyance causing to passengers can be prevented.

Further, while the vehicle 10 is stopping, when the engine 12 keeps on starting up, after the time during which the engine 12 which keeps on starting up does not seem to annoy passengers has passed (for example, between a few minutes and about ten minutes), flag F can be reset. Accordingly, it is judged whether cooling capacity is maintained. When the cooling capacity is maintained, the routine goes to Step 122 where the engine 12 can be stopped.

Next, a description of a second embodiment of the present invention will be given hereinafter. The present second embodiment is structured in the same manner as the first embodiment, and a description thereof will be omitted.

Next, with reference to a flowchart shown in FIG. 3, a "start engine" demand for the engine 12 to the engine ECU 24 by the air conditioner ECU 50 will be explained.

The routine in this flowchart is executed/terminated due to ON/OFF operation of the air conditioner 30 which is operated by an operation switch provided at setting means (not shown).

Figure 3:
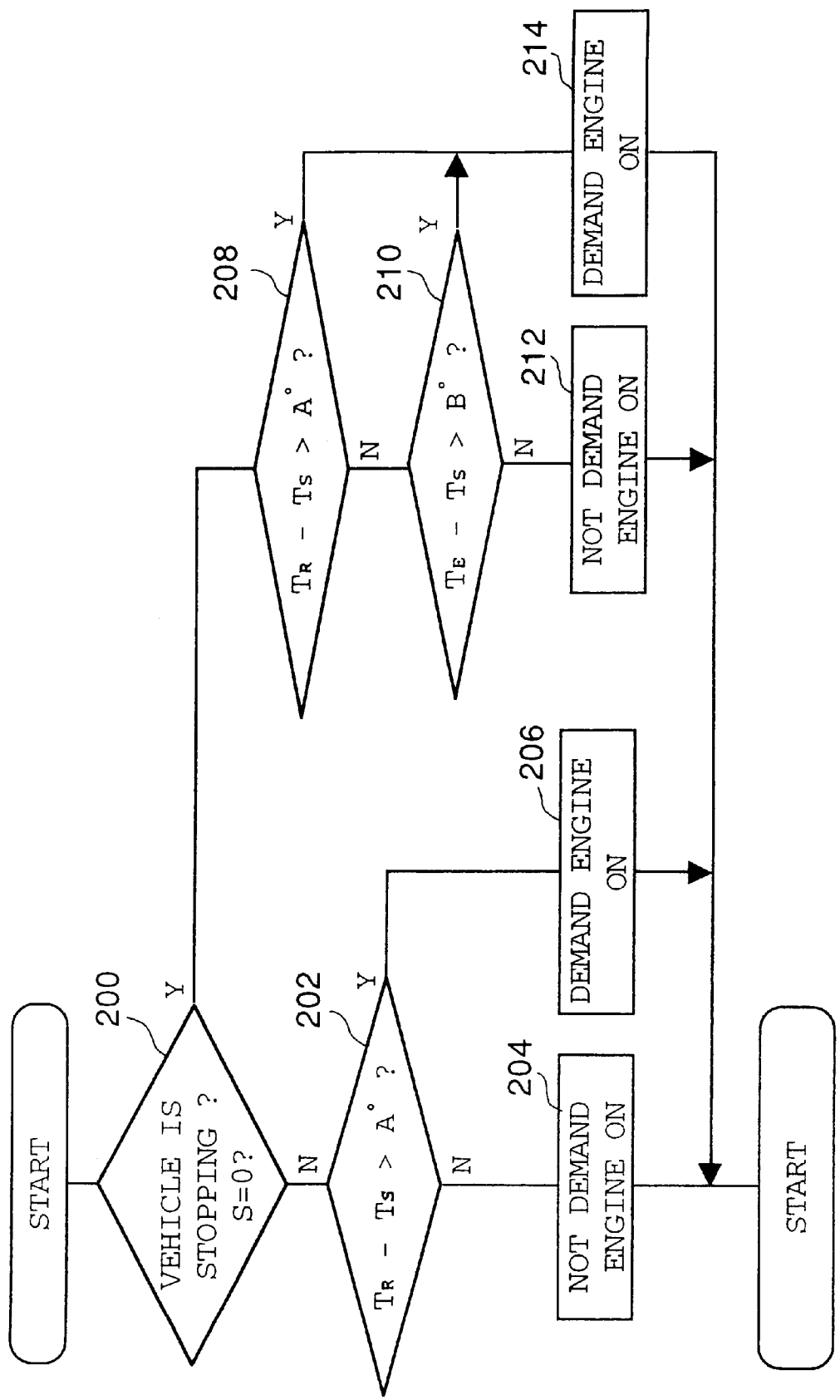

In Step 200 of FIG. 3, it is judged whether the vehicle 10 is traveling. Namely, it is judged whether a vehicle speed S outputted from the engine ECU 24 is equal to 0 (S=0).

In a traveling state of the vehicle 10, a vehicle speed S outputted from the engine ECU 24 is not equal to 0 (S≠0). Accordingly, the judgment is negative in Step 200, and the routine proceeds to Step 202.

In Step 202, it is judged whether the difference between the temperature of the vehicle interior portion $T_R$ and a setting temperature $T_S$ is more than a predetermined temperature A°. In a case in which the difference between the temperature of the vehicle interior portion $T_R$ and a setting temperature $T_S$ is equal to or less than a predetermined temperature A°, the routine goes to Step 204 where a "start engine" demand is not outputted to the engine ECU 24, and exits this flowchart.

In a case in which the difference between the temperature of the vehicle interior portion $T_R$ and a setting temperature $T_S$ is more than a predetermined temperature A°, the routine goes to Step 206 where a "start engine" demand is outputted to the engine ECU 24.

In a stopping state of the vehicle 10, the judgment is affirmative in Step 200 and the routine goes to Step 208. In Step 208, it is judged whether the difference between the temperature of the vehicle interior portion $T_R$ and a setting temperature $T_S$ is more than a predetermined temperature A°. In a case in which the difference between the temperature of the vehicle interior portion $T_R$ and a setting temperature $T_S$ is more than a predetermined temperature A°, it is judged that sufficient cooling capacity is not maintained. The routine goes to Step 214 where a "start engine" demand is outputted to the engine ECU 24.

In a case in which the difference between the temperature of the vehicle interior portion $T_R$ and a setting temperature $T_S$ is equal to or lower than a predetermined temperature A°, in Step 210, it is judged whether the temperature after evaporator $T_E$ is more than a predetermined temperature B°.

In a case in which the temperature after evaporator $T_E$ is more than a predetermined temperature B°, it can be determined that the temperature is more than a maximum value of a range of the temperature at which a human being usually feel comfortable. In this case, it is judged that sufficient cooling capacity is not maintained. The routine goes to Step 214.

In a case in which the temperature after evaporator $T_E$ is less than or equal to a predetermined temperature B°, it can be judged that sufficient cooling capacity is maintained through the evaporator 324. The routine proceeds to Step 212 and exits the flowchart without outputting a signal of a "start engine" demand.

In a case in which the difference between the temperature of the vehicle interior portion $T_R$ and the setting temperature $T_S$ is equal to or lower than a predetermined temperature A° and the temperature after evaporator $T_E$ is equal to or lower than the predetermined temperature B°, a "start engine" demand is not outputted. The engine 12 can be started at the minimum of necessity. Accordingly, the amount of fuel consumed can be reduced.

The aforementioned first and second embodiments show an example of the present invention, and the structures of a hybrid car and an air conditioner according to the present invention are not limited to those embodiments. The present invention is applicable to an air conditioning controller provided in a hybrid car which has various structures and can drive the engine at a maximum efficiency by using an assist motor.

What is claimed is:

1. An air conditioning controller for a hybrid car, which is provided in the hybrid car being equipped with an engine and an electric motor and having starting means for starting the engine in response to a "start engine" demand, and which controls an air conditioner for air-conditioning a vehicle interior portion via a cooling cycle formed by a compressor and an evaporator, comprising:

temperature after evaporator detecting sensor which detects the temperature of air cooled by said evaporator;

judging means which judges whether the temperature after said evaporator detected by said temperature after evaporator detecting sensor is equal to or lower than a predetermined temperature; and stopping means which stops said "start engine" demand when the temperature after said evaporator detected by said temperature after evaporator detecting sensor is judged to be equal to or lower than a predetermined temperature.

2. An air conditioning controller for a hybrid car according to claim 1, wherein in a case in which the temperature after evaporator detected by said temperature after evaporator detecting sensor is equal to or higher than a predetermined temperature, said starting means outputs an "start engine" demand.

3. An air conditioning controller for a hybrid car according to claim 1, wherein said predetermined temperature is a temperature at which it can be judged that minimum cooling capacity can be maintained without driving the compressor.

4. An air conditioning controller for a hybrid car according to claim 3, wherein said predetermined temperature is the higher of the temperature needed for minimum cooling capacity and the temperature of the blowout air at the time when the air-conditioned air is blown into the vehicle interior portion so that the temperature of the vehicle interior portion is kept at a set temperature.

5. An air conditioning controller for a hybrid car according to claim 1, wherein said judging means is structured by first judging means which judges the higher of the temperature needed for minimum cooling capacity and the temperature of the blowout air at the time when the air-conditioned air is blown into the vehicle interior portion so that the temperature of the vehicle interior portion is kept at a set temperature; and second judging means which judges whether said detected temperature after said evaporator is equal to or lower than the temperature which has been judged to be higher by said first judging means.

6. An air conditioning controller for a hybrid car according to claim 1, wherein said predetermined temperature is a value which decreases as the cooling load increases.

7. An air conditioning controller for a hybrid car according to claim 1, wherein said starting means is an engine control computer for driving the engine.

8. An air conditioning controller for a hybrid car according to claim 1, wherein when it has been judged by said judging means that said temperature after said evaporator exceeds a predetermined temperature, stopping of said "start engine" demand by said stopping means is canceled and a "start engine" demand is given to said starting means.

9. An air conditioning controller for a hybrid car according to claim 8, further comprising:
detecting means for detecting whether a vehicle has stopped or not,
wherein in a case in which it has been detected by said detecting means that the vehicle has stopped, the operation of said stopping means is prohibited.

10. An air conditioning controller for a hybrid car according to claim 9, wherein said stopping means can be set to operate when said engine keeps on driving for a predetermined period of time.

11. An air conditioning controller for a hybrid car according to claim 9, wherein said detecting means is an engine control computer which drives the engine, or a vehicle speed means which detects vehicle speed.

12. An air conditioning controller for a hybrid car according to claim 10, wherein said detecting means is the engine control computer or the vehicle speed means.

13. An air conditioning controller for a hybrid car, which is provided in the hybrid car being equipped with an engine and an electric motor and having an engine control computer for starting the engine in response to a "start engine" demand, and which has a computer for an air conditioner which controls an air conditioner for air-conditioning a vehicle interior portion via a cooling cycle formed by a compressor and an evaporator, comprising:
temperature after evaporator detecting sensor which detects the temperature of air cooled by said evaporator;
said computer for an air conditioner judges whether the temperature after said evaporator detected by said temperature after evaporator detecting sensor is equal to or lower than a predetermined temperature and stops the "start engine" demand when the temperature after said evaporator detected by said temperature after evaporator detecting sensor is judged to be equal to or lower than a predetermined temperature.

14. An air conditioning controller for a hybrid car according to claim 13, wherein in a case in which the temperature after evaporator detected by said temperature after evaporator detecting sensor is equal to or higher than a predetermined temperature, said starting means outputs an "start engine" demand.

15. An air conditioning controller for a hybrid car according to claim 13, wherein said predetermined temperature is a temperature at which it can be judged that minimum cooling capacity can be maintained without driving a compressor.

16. An air conditioning controller for a hybrid car according to claim 15, wherein said predetermined temperature is the higher of the temperature needed for minimum cooling capacity and the temperature of the blowout air at the time when the air-conditioned air is blown into the vehicle interior portion so that the temperature of the vehicle interior portion is kept at a set temperature.

17. An air conditioning controller for a hybrid car according to claim 16, wherein said computer for an air conditioner judges the higher of the temperature needed for minimum cooling capacity and the temperature of the blowout air at the time when the air-conditioned air is blown into the vehicle interior portion so that the temperature of the vehicle interior portion is kept at a set temperature and judges whether said detected temperature after said evaporator is equal to or lower than the temperature which has been judged to be higher by the judgment, and thereby judges whether the temperature after said evaporator detected by said temperature after evaporator detecting sensor is equal to or lower than a predetermined temperature.

18. An air conditioning controller for a hybrid car according to claim 15, wherein said predetermined temperature has a temperature which decreases as the cooling load increases.

19. An air conditioning controller for a hybrid car, which is provided in the hybrid car being equipped with an engine and an electric motor and having starting means for starting the engine in response to a "start engine" demand, and which controls an air conditioner for air-conditioning a vehicle interior portion via a cooling cycle formed by a compressor and an evaporator, comprising:
a temperature after evaporator detecting sensor which detects the temperature of air cooled by said evaporator;
a vehicle interior portion temperature detecting sensor which detects the temperature of the vehicle interior portion;
first judging mean which judges whether the difference between the temperature of the vehicle interior portion detected by said vehicle interior portion temperature detecting sensor and a set temperature is greater than a predetermined value;

second judging means which judges whether the temperature after said evaporator detected by said temperature after evaporator detecting sensor is greater than a predetermined temperature in a case in which the result of the judgment by said first judging means is negative; and stopping means which stops said "start engine" demand in a case in which the result of the judgment by said second judging means is negative.

20. An air conditioning controller for a hybrid car according to claim 19, wherein said starting means is an engine control computer which drives the engine.

21. An air conditioning controller for a hybrid car according to claim 19, wherein, when the result of the judgment by said first judging means is affirmative, and the result of the judgment by said second judging means is affirmative, stopping of said "start engine" demand by said stopping means is canceled and a "start engine" demand is given to said starting means.

22. An air conditioning controller for a hybrid car according to claim 21, wherein said detecting means is the engine control computer which drives the engine or the vehicle speed means which detects vehicle speed.

* * * * *